United States Patent [19]
Sato

[11] Patent Number: 5,483,643
[45] Date of Patent: Jan. 9, 1996

[54] CONTROL CIRCUIT FOR DATA TRANSFER BETWEEN A MAIN MEMORY AND A REGISTER FILE

[75] Inventor: Yuichi Sato, Ibaragi, Japan

[73] Assignee: NEC Corporation, Tokyo, Japan

[21] Appl. No.: 39,788

[22] Filed: Mar. 30, 1993

[30] Foreign Application Priority Data

Mar. 30, 1992 [JP] Japan ........................................ 4-74529

[51] Int. Cl.$^6$ .............................. G06F 12/02; G06F 13/00
[52] U.S. Cl. ....................... 395/401; 395/421.1; 395/410; 364/DIG. 1
[58] Field of Search ...................... 395/402, 425

[56] References Cited

U.S. PATENT DOCUMENTS

5,165,038  11/1992  Beard et al. ............................ 395/800

*Primary Examiner*—Michael A. Whitfield
*Attorney, Agent, or Firm*—Foley & Lardner

[57] ABSTRACT

A control circuit for data transfer between a main memory and a register file. Firstly, the control circuit acquires, via a selector, a save area mask (SAM) data from external circuitry. A register file address generator produces a register file address using the SAM data which has been chosen by the selector. The register file address determines a location of a register in the register file. A SAM data renewal circuit is provided to renew the SAM data selected by the selector. The SAM data which has been renewed will be used for addressing another register in the register file. The renewal circuit supplies the selector with the SAM data which has been renewed. A controller is arranged to receive the SAM data chosen by the selector and generates a control signal according thereto. The control signal is applied to the selector and controls same such as to select the SAM data from the external circuit or the SAM data applied from the SAM data renewal circuit.

6 Claims, 6 Drawing Sheets

CONTROL CIRCUIT FOR DATA TRANSFER BETWEEN A MAIN MEMORY AND A REGISTER FILE

BACKGROUND OF THE INVENTION

1. Field of the Invention

The present invention relates generally to a control circuit for data transfer between a main memory and a register file in a digital data processing system, and more specifically to such a control circuit which is capable of markedly reducing execution time of the data transfer and by which a microprogram dedicated to the data transfer is no longer required.

2. Description of Related Art

As is known in the art, a register file is a hardware storage area for temporarily storing data applied from a main memory. The data stored in the register file can be again transferred to the main memory as requested. The register file includes a plurality of registers each of which is capable of storing one word.

In order to specify a plurality of registers (or a single register) for data transfer between the main memory and the register file, a so-called save area mask (SAM) data is applied to a control circuit which is operatively coupled to the register file. The SAM data is used to generate a register file address(es).

Figure 1:
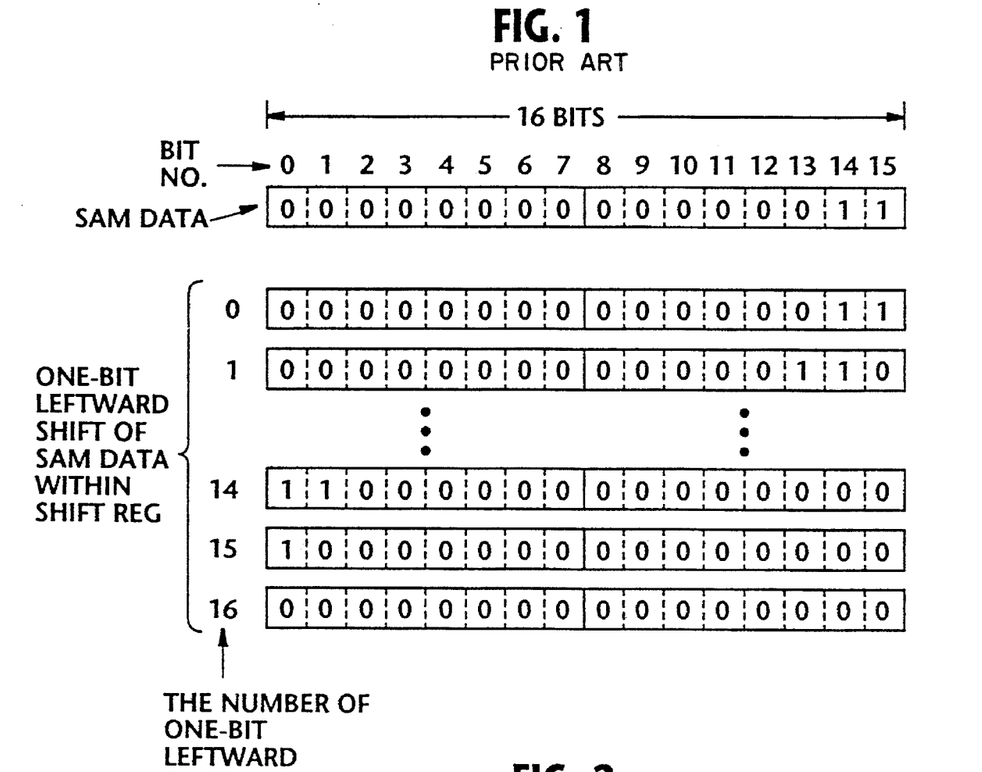
FIG. 1 is a chart showing a save area mask (SAM) data discussed in the opening paragraphs of the instant disclosure.
Figure 2:
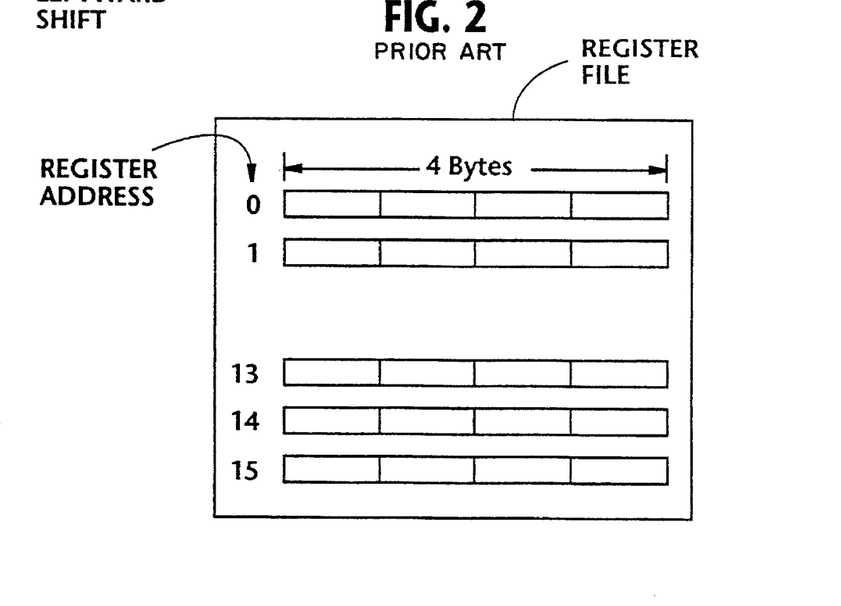
FIG. 2 is a chart showing an example of a register file which has been referred to in the opening paragraphs of the instant disclosure.

Before turning to the present invention it is deemed preferable to discuss, with reference to FIGS. 1 and 2, a known technique for the above-mentioned data transfer.

FIG. 1 is a chart showing one example of the SAM data whose bit length is 16 in this particular case, and further illustrates a plurality of one-bit leftward shifts of the SAM data by a shift register (not shown) for determining the register file addresses. On the other hand, FIG. 2 schematically illustrates an example of a register file which, in this case, includes 16 registers each having 4-byte storage capacity.

It is assumed that the SAM data shown in FIG. 1 includes logic 1s at the 14th and 15th bit positions which indicate respectively the 14th and 15th registers of the register file (FIG. 2).

In order to generate register file addresses, a counter (not shown) should be provided to determine the number of one-bit left shifts of the SAM data until each of logic 1s is located at the leftmost bit position. In the illustrated case, a logic 1 at the 14th bit position is shifted to the leftmost bit position after 14 leftward shifts. Thus, a file register address generator (not shown) is able to determine the register address for the 14th register of the register file. Subsequently, a logic 1 at the 15th bit position of the SAM data is shifted to the leftmost bit position. Accordingly, the counter determines the register file for the 15th register of the register file.

However, the aforesaid known technique has encountered the problem in that a large number of one-bit shifts of the SAM data are inevitably required for determining the register file addresses. Thus, the data transfer according to the known technique is considerably slow in time. In the worst case, one-bit shifts of the almost full length of the SAM data is undesirably required as discussed above. Accordingly, it is highly desirable to effectively accelerate the data transfer.

Further, the known technique has encountered another problem in that it requires a microprogram which is dedicated to the generation of the register file addresses.

SUMMARY OF THE INVENTION

It is an object of the present invention to provide a control circuit which exhibits a very fast data transfer between a main memory and a register file as compared with the aforesaid prior art.

Another object of the present invention is to provide a control circuit which requires no microprogram which is dedicated to data transfer between a main memory and a register file.

In order to fulfill the objects, the control circuit firstly acquires, via a selector, a save area mask (SAM) data from external circuitry. A register file address generator produces a register file address using the SAM data which has been chosen by the selector. The register file address determines a location of a register in the register file. A SAM data renewal circuit is provided to renew the SAM data selected by the selector. The SAM data which has been renewed will be used for addressing another register in the register file. The renewal circuit supplies the selector with the SAM data which has been renewed. A controller is arranged to receive the SAM data chosen by the selector and generates a control signal according thereto. The control signal is applied to the selector and controls same such as to select the SAM data from the external circuit or the SAM data applied from the SAM data renewal circuit.

More specifically a first aspect of the present invention resides in a control circuit for data transfer between a main memory and a register file using a save area mask (SAM) data applied to said control circuit, comprising: first means for selecting one of first and second inputs, said first means selecting said first input which corresponds to said SAM data applied to said control circuit; second means coupled to receive said SAM data selected by said first means, said second means generating a register file address using said SAM data received, said register file address specifying a location of a register of a register group to be accessed in said register file; third means coupled to said first means, said third means renewing said SAM data selected by said first means for addressing another register of said register group, said third means supplying said first means with said SAM data renewed as said second input; fourth means coupled to said first means, said fourth means generating a first control signal which assumes a first logic state if detecting information of register file addressing in said SAM data selected by said first means, said first logic state assuming a second logic state if detecting no information of said register file addressing in said SAM data selected by said first means or if receiving no SAM data from said first means, said first control signal being applied to said first means; wherein said first means selects said first input in response to said second logic state and allows said first means to select said second input in response to said first logic state.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A first embodiment of the present invention will be discussed with reference to FIGS. 3–6.

Figure 3:
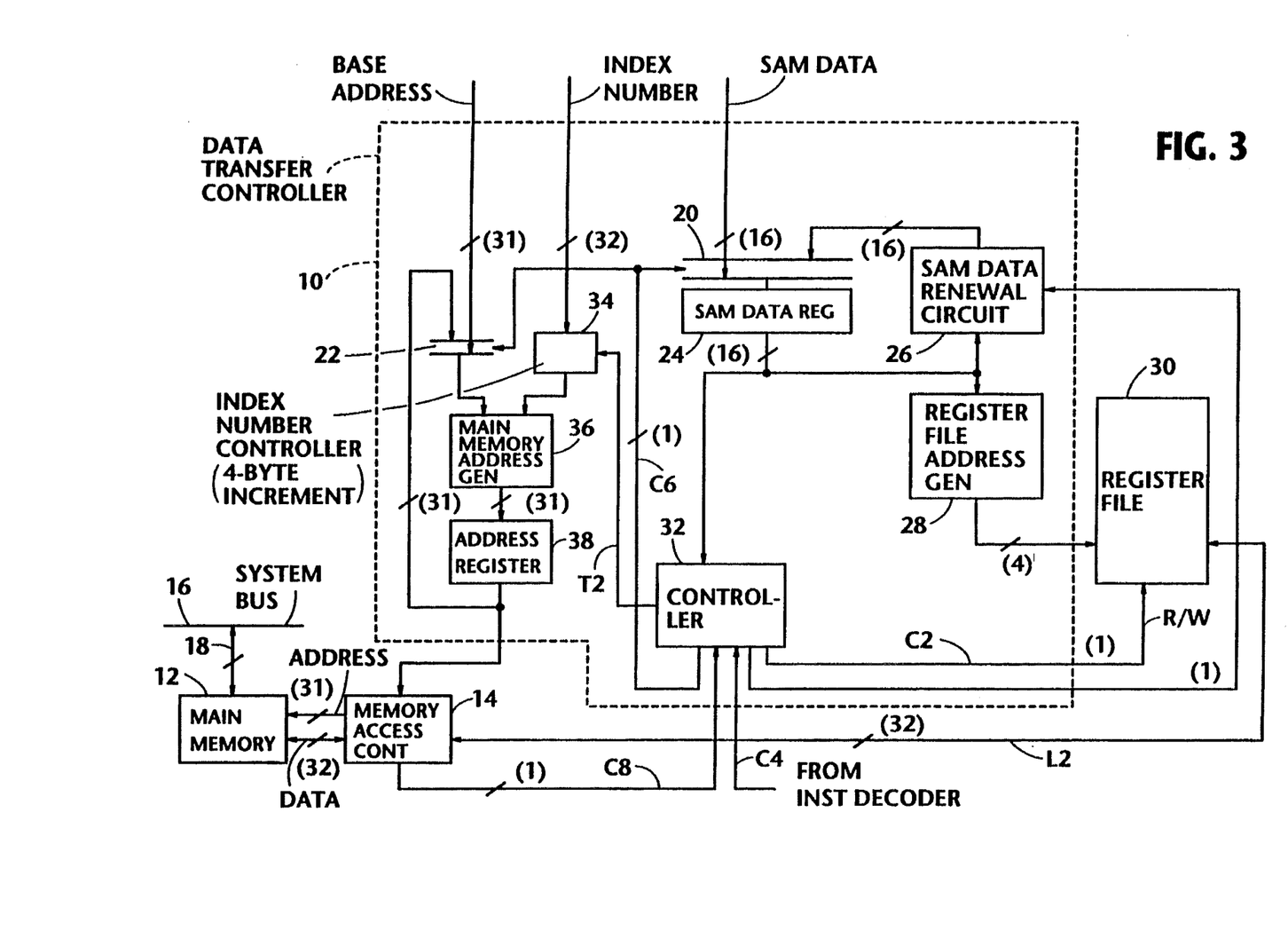
FIG. 3 is a block diagram showing a first embodiment of the present invention.

A data transfer controller 10 enclosed by a broken line, is operatively coupled to a register file 30 and a main memory 12 via a memory access controller 14. In FIG. 3, the blocks except for the main memory 12 are included in a central processing unit (CPU). The main memory 12 is coupled, via an address/data/control bus 18, to a system bus 16 provided in the CPU. Data are stored in the main memory 12 and/or written therefrom under the control of a suitable control section (not shown) within the CPU as is well known in the art. The present invention is not directly concerned with data read/write operations with the main memory 12 using the buses 16, 18. Accordingly, further descriptions thereof will not be described for the sake of brevity.

The data transfer controller 10 includes, two selectors 20 and 22, a save area mask (SAM) data register 24, a SAM data renewal circuit 26, a register file address generator 28, a controller 32, an index number controller 34, a main memory address generator 36, and an address register 38, all of which are coupled as shown. Each numeral which is parenthesized in FIG. 3, depicts the number of bits of a line adjacent thereto. However, the number of bits thus indicated is merely exemplary and is in no way limited thereto.

The data transfer controller 10 is supplied with a SAM data and then controls the data transfer between the register file 30 and the main memory 12. As mentioned above, the register file 30 is used as a temporary saving area of a main memory.

Figure 4:
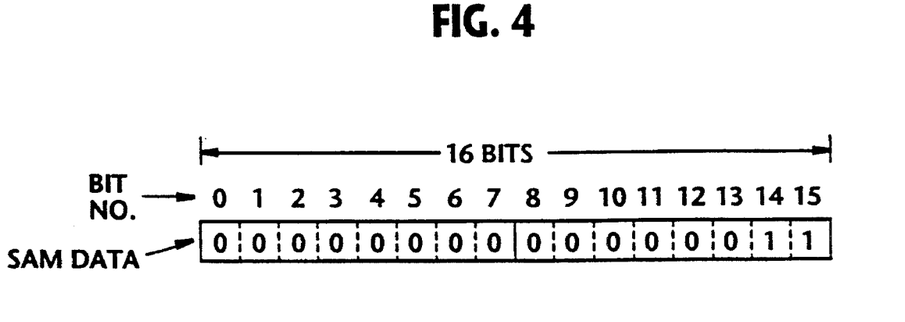
FIG. 4 is a chart showing a save area mask (SAM) data for discussing the first embodiment.

FIG. 4 is a chart showing a bit pattern of a SAM data which has 16 bit length in this particular case and is identical with the SAM data shown in FIG. 1. The SAM data is generated from a suitable register section (not shown) within the CPU according to SAM information included in a read/write instruction in connection with the data transfer in question.

Figure 5:
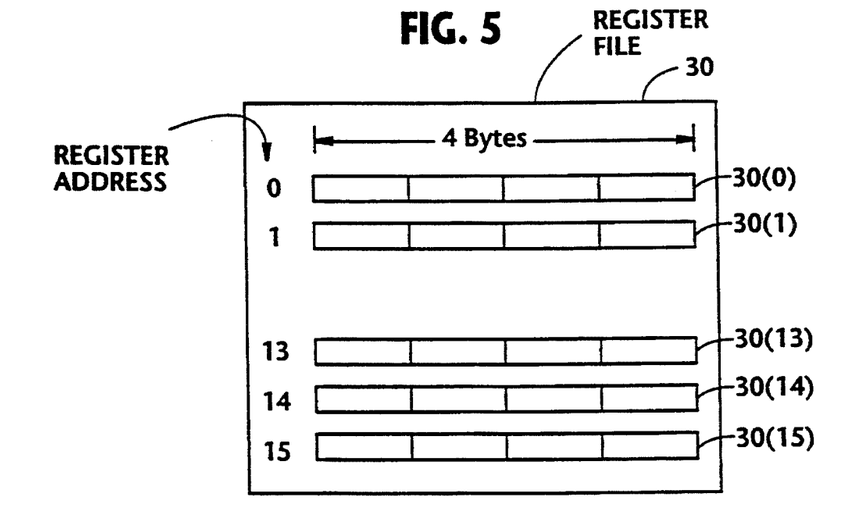
FIG. 5 is an example of a register file for discussing the first embodiment.

FIG. 5 is a chart schematically showing an example of the register file 30 which includes, merely by way of example, sixteen (16) registers 30(0)–30(15) whose locations can be specified by register addresses 0–15, respectively.

Figure 6:
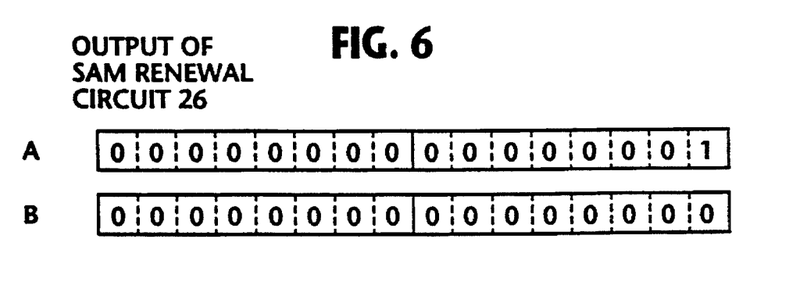
FIG. 6 is a chart showing outputs of a block shown in FIG. 3.

FIG. 6 shows bit patterns of two outputs (depicted by A and B) of the SAM data renewal circuit 26. The output of the circuit 26 has a 16-bit length as shown.

Merely for the convenience of description it is assumed that: (a) the register file 30 has already received data from the main memory 12, (b) a SAM data applied to the selector 20 includes logic 1s at the 14th and 15th bit positions thereof as shown in FIG. 4 and (c) the data in the register file 30 are to be transferred to the main memory 12.

The bit positions 0–15 of the SAM data correspond to the registers 30(0)–30(15), respectively. In more specific terms, a logic 1 at a given bit position of the SAM data indicates that data should be read out of the corresponding register (or written thereunto) while a logic 0 indicates no data read/write operation in connection with the corresponding register. In order to determine data read or write operation on the registers of the register file 30, the controller 32 supplies the register file 30 with a control signal C2 which is generated using a control signal C4 applied thereto from an instruction decoder (not shown).

Initially, the selectors 20 and 22 are respectively ready to pass therethrough a SAM data and a base address in response to a control signal C6 (logic 0 for example) which is applied thereto from the controller 32. Further, the index number controller 34 is arranged to acquire an index number associated with the base address in response to a timing signal T2 generated by the controller 32.

During a given time interval, the SAM data shown in FIG. 4 is applied to the SAM data register 24 via the selector 20. Further, a base address and index number are respectively applied to the main memory address generator 36 and the index number controller 34. During the same time interval, the controller 32 detects that the SAM data applied thereto from the register 24 is not zero (viz., 0000 0000 0000 0011) and changes the logic state of the control signal C6 (viz., from "0" to "1"). In response to the control signal C6 (logic 1), the selector 20 is controlled such as to choose the output of the SAM data renewal circuit 26, while the selector 22 is controlled to select the output of the address register 38 instead of the base address.

The register file address generator 28 generates a 4-bit register file address "1110" by detecting a logic 1 at the 14th bit position in the SAM data applied thereto from the SAM data register 24. The register file 30, in response to the address "1110", initiates transfer of data stored in the 14th register 30(14) to the memory access controller 14 over a line L2. When the controller 14 acknowledges receipt of the data from the register file 30, the controller 14 issues a control signal C8 which is applied to the controller 32. On the other hand, the SAM data renewal circuit 26 changes a logic 1 at the 14th bit position in the SAM data (viz., 0000 0000 0000 0011). Further, during the same time duration, the main memory address generator 36 issues a main memory address using the base address and the index number both applied thereto, and then applies the main memory address thus obtained to the address register 38. The memory access controller 14 writes the data of the register 30(14) into the main memory 12 using the main memory address from the register 38.

During the following (viz., second) time interval, the index number controller 34 increments, by 4 bytes, the index number stored during the preceding time interval in response to the timing signal T2. Thus, the main memory address generator 36 produces a new main memory address using the output of the register 38 and the new index number.

On the other hand, the SAM data register 24 stores the output of the SAM data renewal circuit 26 (viz., 0000 0000 0000 0001) which is then applied to the controller 32, the register file address generator 28, and the SAM data renewal circuit 26.

As in the aforesaid operations, the controller 32 detects that the SAM data applied from the register 24 is not zero (viz., 0000 0000 0000 0001) and continues to issue the control signal C6 which assumes a logic 1. Thus, the selector 20 is controlled such as to choose the output of the SAM data renewal circuit 26, while the selector 22 selects the output of the address register 38.

The register file address generator 28 creates a new address "1111" by detecting a logic 1 at the 15th bit position in the SAM data. The register file 30, in response to the address "1111" applied thereto, initiates transfer of data stored in the last register 30(15) to the memory access controller 14 over the line L2. As mentioned above, when the controller 14 acknowledges receipt of the data from the register file 30, the controller 14 issues the control signal C8 which is applied to the controller 32. On the other hand, the SAM data renewal circuit 26 changes the logic state at the 15th bit position within the SAM data (viz., 0000 0000 0000 0001). Thus, the output of the renewal circuit now becomes "0000 0000 0000 0000".

The memory access controller 14 writes the data of the register 30(15) into the main memory 12 according to the new address from the address register 38.

During the subsequent (viz., third) time interval, the selector 20 also steers the output of the SAM data renewal circuit 26 towards the register 24. Following this, the controller 32 detects the zero value of the data stored in the SAM data register 24 and changes the logic state of the control signal C6 from "1" to "0". Accordingly, each of the selectors 20 and 22 returns to the original state thereof and thus is ready to acquire new data from the external circuitry.

A second embodiment of the present invention will be discussed with reference to FIG. 7.

Figure 7:
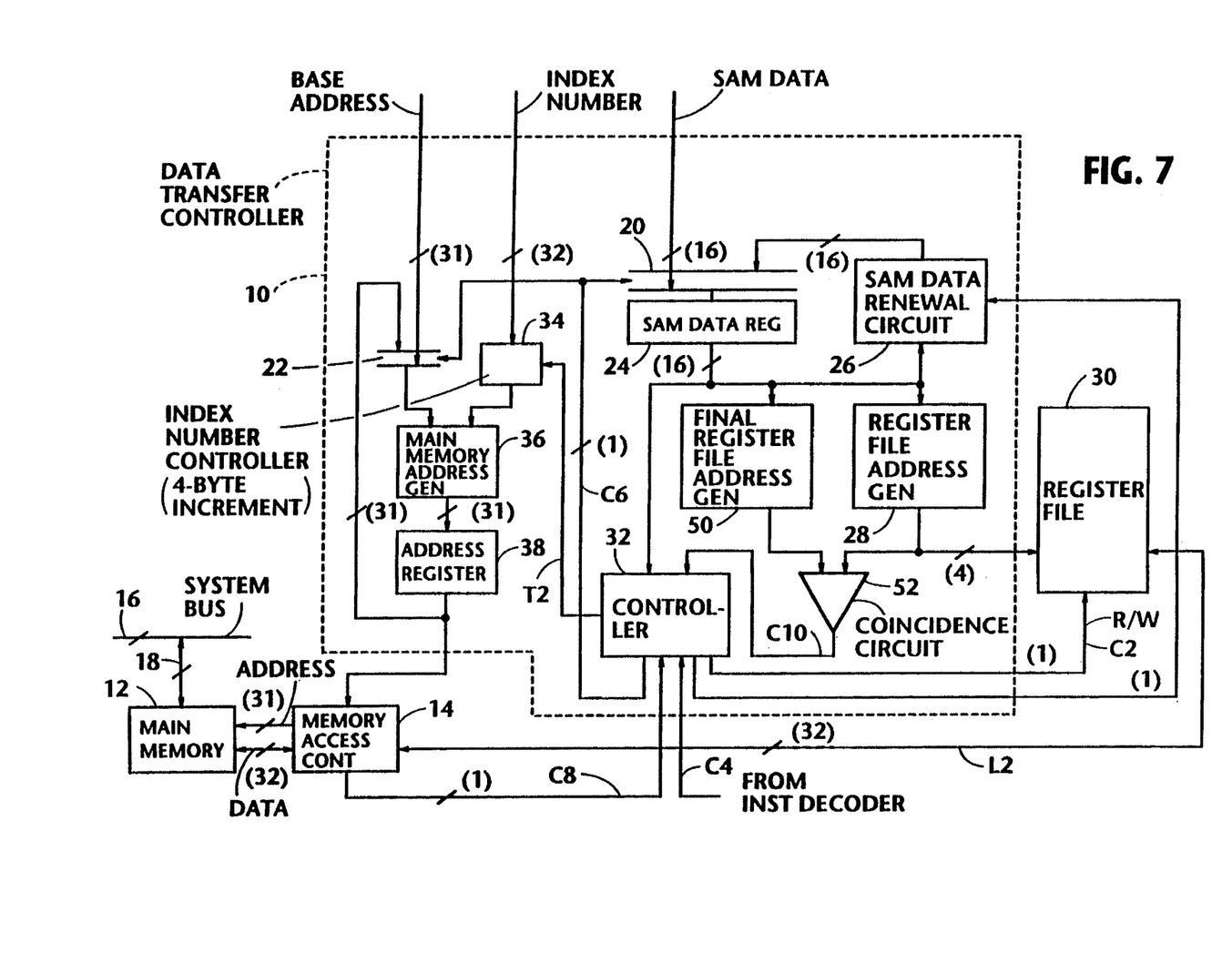
FIG. 7 is a block diagram showing a second embodiment of the present invention.

The arrangement of FIG. 7 differs from that of FIG. 3 in that the former arrangement further includes a final register file address generator 50 and a coincidence detector 52. The remaining portions of the arrangement of FIG. 7 are identical with the counterparts of FIG. 3, and thus further descriptions thereof will not be referred to for the sake of brevity.

It is assumed that the SAM data shown in FIG. 4 is applied to the arrangement of FIG. 7. The final register file address generator 50 is provided to generate the final or last register file address during the time interval for which the SAM data is initially applied to the data transfer controller 10. More specifically, the generator 50 creates the final register file address "1111" in this particular case. The coincidence detector 52 receives, during the first time interval, the outputs of the two address generators 28 and 50 (viz., "1110" and "1111"). In this instance, the coincidence detector 52 does not generate a coincidence signal C10.

However, during the following time interval, the detector 52 is supplied with the same address "1111" from both of the two address generators 28 and 50. Thus, the detector 52 outputs the coincidence signal C10 therefrom. The controller 32, in response to the control signal C10, changes the logic state of the control signal C6 from "1" to "0" during the same time interval.

This means that each of the selectors 20 and 22 is capable of returning to the original state thereof during the second time interval. It is understood that according to the second embodiment, the selectors 20 and 22 are able to return to the original states thereof one time interval earlier as compared with the first embodiment.

A third embodiment of the present invention will be discussed with reference to FIGS. 8–10.

Figure 8:
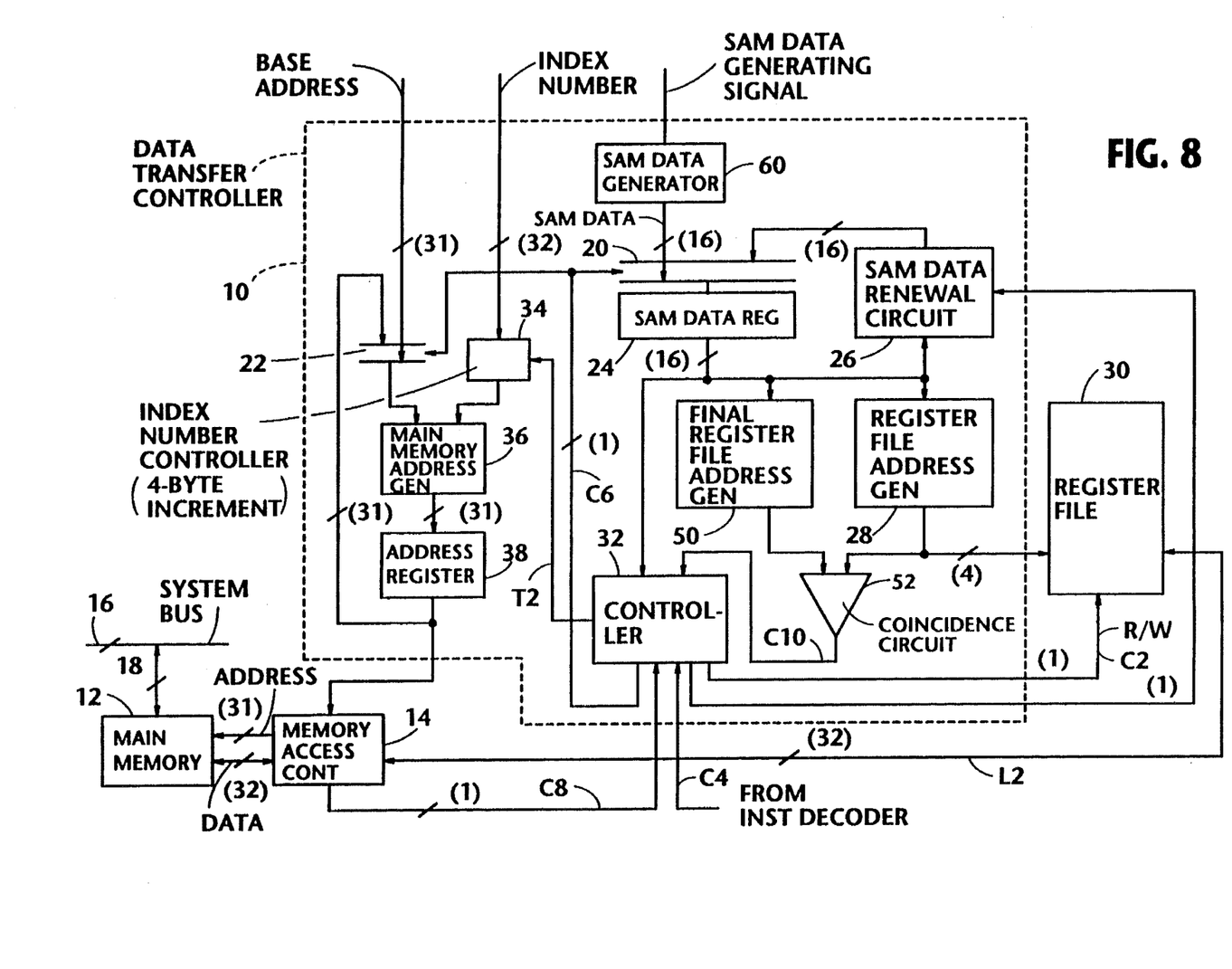
FIG. 8 is a block diagram showing a third embodiment of the present invention.

The arrangement of FIG. 8 differs from that of FIG. 7 in that the former arrangement further includes a SAM data generator 60. The remaining portions of the arrangement of FIG. 8 are identical with the corresponding ones of FIG. 7 and thus further descriptions thereof are redundant.

Figure 9:
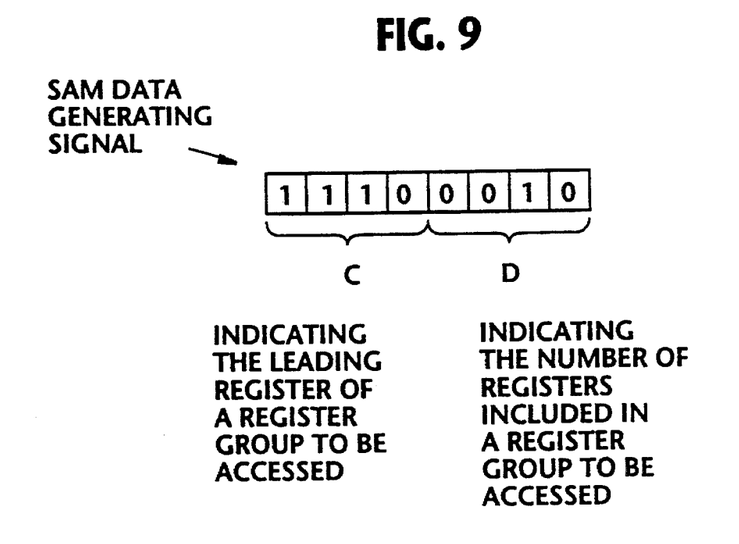
FIG. 9 is a chart showing a SAM data generating signal for discussing the third embodiment.
Figure 10:
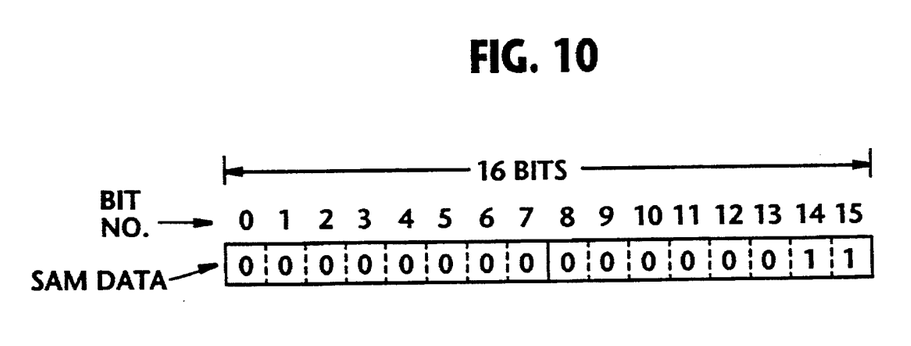
FIG. 10 is a chart showing a SAM data which is produced by the register file address generating signal shown in FIG. 9.

FIG. 9 shows an example of a SAM data generating signal which is applied to the SAM data generator 60, while FIG. 10 shows the output of the generator 60. The SAM data shown in FIG. 10 is identical to that shown in FIG. 4. The SAM data generating signal has 8-bit length in this particular case and is divided into two 4-bit sections C and D. The section C indicates the leading register of a register group to be accessed, while the section D indicates the number of registers which is included in the register group to be accessed.

The SAM data generating signal is included in a main memory read/write instruction (not shown) and extracted therefrom using a suitable circuit provided in the external circuitry.

It is understood that: (a) the bit section C specifies a logic 1 at the 14th bit position of the SAM data (FIG. 10) and (b) the bit section D specifies logic 1s at the 14th–15th bit positions of the SAM data (FIG. 10). The following operations of the arrangement of FIG. 8 have already been discussed with the first and second embodiments, and thus further descriptions thereof are deemed redundant.

It will be understood that the above disclosure is representative of three possible embodiments of the present invention and that the concept on which the invention is based is not specifically limited thereto.

What is claimed is:

1. A control circuit for data transfer between a main memory and a register file using a save area mask (SAM) data applied to said control circuit, comprising:

first means for selecting one of first and second inputs, said first means selecting said first input which corresponds to said SAM data applied to said control circuit;

second means coupled to receive said SAM data selected by said first means, said second means generating a register file address using said SAM data received, said register file address specifying a location of a register of a register group to be accessed in said register file;

third means coupled to said first means, said third means renewing said SAM data selected by said first means for addressing another register of said register group, said third means supplying said first means with said SAM data renewed as said second input;

fourth means coupled to said first means, said fourth means generating a first control signal which assumes a first logic state if detecting information of register file addressing in said SAM data selected by said first means, said first logic state assuming a second logic state if detecting no information of said register file addressing in said SAM data selected by said first means or if receiving no SAM data from said first means, said first control signal being applied to said first means, wherein said first means selects said first input in response to said second logic state and allows said first means to select said second input in response to said first logic state.

2. A control circuit as claimed in claim 1, further comprising:

fifth means coupled to said fourth means, said fifth means being arranged to receive main memory address data applied to said control circuit and generating a main memory address under the control of said fourth means.

3. A control circuit as claimed in claim 2, wherein said fourth generates a second control signal in response to data transfer between said main memory and said register file.

4. A control circuit as claimed in claim 3, wherein said main memory address data includes a base address and an index number and wherein said fifth means comprises:

a selector arranged to select said base address in response to said second logic state of said first control signal;

an index number controller arranged to receive said index number, said index number controller increments said index number by a predetermined number of bits in response to said second control signal;

a main memory address generator, coupled to said selector and said index number controller, generating a main memory address which specifies a data location of said main memory.

5. A control circuit as claimed in claim 1, further comprising a SAM data generator which precedes said first means and which receives a SAM data generating signal, said SAM data generating signal including first and second bit sections, said first bit section indicating a leading register to be firstly accessed which is included in said register group, said second bit section indicating the number of registers of said register group, said SAM data generator applying an output thereof to said first means as said first input.

6. A control circuit as claimed in claim 2, further comprising a SAM data generator which precedes said first means and which receives a SAM data generating signal, said SAM data generating signal including first and second bit sections, said first bit section indicating a leading register to be firstly accessed which is included in said register group, said second bit section indicating the number of registers of said register group, said SAM data generator applying an output thereof to said first means as said first input.

* * * * *